(12) United States Patent
Lamesch

(10) Patent No.: US 9,332,592 B2
(45) Date of Patent: May 3, 2016

(54) SEAT HEATER AND CAPACITIVE OCCUPANCY SENSOR COMBINATION

(75) Inventor: Laurent Lamesch, Echternach (LU)

(73) Assignee: IEE INTERNATIONAL ELECTRONICS & ENGINEERING S.A., Luxembourg (LU)

( * ) Notice: Subject to any disclaimer, the term of this patent is extended or adjusted under 35 U.S.C. 154(b) by 83 days.

(21) Appl. No.: 14/131,348

(22) PCT Filed: Jun. 29, 2012

(86) PCT No.: PCT/EP2012/062740
§ 371 (c)(1),
(2), (4) Date: Jan. 7, 2014

(87) PCT Pub. No.: WO2013/007541
PCT Pub. Date: Jan. 17, 2013

(65) Prior Publication Data
US 2014/0131344 A1 May 15, 2014

(30) Foreign Application Priority Data

Jul. 8, 2011 (LU) .......................................... 91838

(51) Int. Cl.
| | |
|---|---|
| *H05B 1/02* | (2006.01) |
| *H05B 3/02* | (2006.01) |
| *B60N 2/00* | (2006.01) |
| *B60N 2/56* | (2006.01) |

(52) U.S. Cl.
CPC *H05B 3/02* (2013.01); *B60N 2/002* (2013.01); *B60N 2/5685* (2013.01)

(58) Field of Classification Search
CPC ...... H05B 1/0202; H05B 3/02; H05B 1/0238; H05B 3/0042; B60N 2/002; B60N 3/0042
USPC .................. 219/492, 497, 501, 506, 507, 202
See application file for complete search history.

(56) References Cited

U.S. PATENT DOCUMENTS

| | | | |
|---|---|---|---|
| 6,161,070 A | 12/2000 | Jinno et al. | |
| 6,348,862 B1 * | 2/2002 | McDonnell et al. | .......... 340/562 |
| 6,392,542 B1 | 5/2002 | Stanley | |
| 6,703,845 B2 | 3/2004 | Stanley et al. | |

(Continued)

FOREIGN PATENT DOCUMENTS

| | | |
|---|---|---|
| WO | 9217344 A1 | 10/1992 |
| WO | 9513204 A1 | 5/1995 |

OTHER PUBLICATIONS

International Search Report for corresponding application PCT/EP2012/062740 filed Jun. 29, 2012; Mail date Sep. 3, 2012.

(Continued)

*Primary Examiner* — Mark Paschall
(74) *Attorney, Agent, or Firm* — Cantor Colburn LLP

(57) ABSTRACT

In a combined seat heater and capacitive occupancy sensor, the present invention proposes to perform two measurements with two different frequencies. In a first step, the carrier frequency is set to a first known carrier frequency, the complex current through inductance and unknown capacitance and complex drive voltage are measured. In a second step, the carrier frequency is set to a second known carrier frequency, the complex current through inductance and unknown capacitance and complex drive voltage are measured. The measured complex values are used in a formula which yields the unknown capacitance.

10 Claims, 2 Drawing Sheets

(56) References Cited

U.S. PATENT DOCUMENTS

| | | | |
|---|---|---|---|
| 7,521,940 B2 | 4/2009 | Koch et al. | |
| 2007/0194900 A1* | 8/2007 | Hawkins et al. | 340/457.1 |
| 2009/0295199 A1* | 12/2009 | Kincaid et al. | 297/180.12 |
| 2010/0295563 A1* | 11/2010 | Bieck et al. | 324/679 |
| 2011/0121618 A1 | 5/2011 | Fischer et al. | |
| 2011/0148648 A1 | 6/2011 | Fischer et al. | |

OTHER PUBLICATIONS

J.R. Smith, "Electric Field Sensing for Graphical Interfaces" Computer Graphics I/O Devices, Issue May/Jun. 1998, pp. 54-60.
Written Opinion for corresponding application PCT/EP2012/062740 filed Jun. 29, 2012; Mail date Sep. 3, 2012.

\* cited by examiner

SEAT HEATER AND CAPACITIVE OCCUPANCY SENSOR COMBINATION

TECHNICAL FIELD

The present invention generally relates to a capacitive occupant detection system, e.g. for detecting the absence or presence of an occupant seated on a vehicle seat. More specifically, the invention relates to a combined seat heating and capacitively occupancy-sensing device.

BACKGROUND

A capacitive sensor, called by some electric field sensor or proximity sensor, designates a sensor, which generates a signal responsive to the influence of what is being sensed (a person, a part of a person's body, a pet, an object, etc.) upon an electric field. A capacitive sensor generally comprises at least one antenna electrode, to which is applied an oscillating electric signal and which thereupon emits an electric field into a region of space proximate to the antenna electrode, while the sensor is operating. The sensor comprises at least one sensing electrode at which the influence of an object or living being on the electric field is detected. In some (so-called "loading mode) capacitive occupancy sensors, the one or more antenna electrodes serve at the same time as sensing electrodes. In this case, the measurement circuit determines the current flowing into the one or more antenna electrodes in response to an oscillating voltage being applied to them. The relationship of voltage to current yields the complex impedance of the one or more antenna electrodes. In an alternative version of capacitive sensors ("coupling mode" capacitive sensors), the transmitting antenna electrode(s) and the sensing electrode(s) are separate from one another. In this case, the measurement circuit determines the current or voltage that is induced in the sensing electrode when the transmitting antenna electrode is operating.

The different capacitive sensing mechanisms are explained in the technical paper entitled "Electric Field Sensing for Graphical Interfaces" by J. R. Smith, published in Computer Graphics I/O Devices, Issue May/June 1998, pp 54-60. The paper describes the concept of electric field sensing as used for making non-contact three-dimensional position measurements, and more particularly for sensing the position of a human hand for purposes of providing three dimensional positional inputs to a computer. Within the general concept of capacitive sensing, the author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", an oscillating voltage signal is applied to the transmit electrode, building up an electric field to a receive electrode, and the displacement current induced at the receive electrode is measured, whereby the displacement current may be modified by the body being sensed. In the "transmit mode", the transmit electrode is put in contact with the user's body, which then becomes a transmitter relative to a receiver, either by direct electrical connection or via capacitive coupling. "Shunt mode" is alternatively referred to as the above-mentioned "coupling mode".

Capacitive occupant sensing systems have been proposed in great variety, e.g. for controlling the deployment of one or more airbags, such as e.g. a driver airbag, a passenger airbag and/or a side airbag. U.S. Pat. No. 6,161,070, to Jinno et al., relates to a passenger detection system including a single antenna electrode mounted on a surface of a passenger seat in an automobile. An oscillator applies on oscillating voltage signal to the antenna electrode, whereby a minute electric field is produced around the antenna electrode. Jinno proposes detecting the presence or absence of a passenger in the seat based on the amplitude and the phase of the current flowing to the antenna electrode. U.S. Pat. No. 6,392,542, to Stanley, teaches an electric field sensor comprising an electrode mountable within a seat and operatively coupled to a sensing circuit, which applies to the electrode an oscillating or pulsed signal "at most weakly responsive" to wetness of the seat. Stanley proposes to measure phase and amplitude of the current flowing to the electrode to detect an occupied or an empty seat and to compensate for seat wetness.

The idea of using the heating element of a seat heater as an antenna electrode of a capacitive occupancy sensing system has been known for a long time. WO 92/17344 A1 discloses a an electrically heated vehicle seat with a conductor, which can be heated by the passage of electrical current, located in the seating surface, wherein the conductor also forms one electrode of a two-electrode seat occupancy sensor. WO 95/13204 discloses a similar system, in which the oscillation frequency of an oscillator connected to the heating element is measured to derive the occupancy state of the vehicle seat.

U.S. Pat. No. 7,521,940 relates to a combined seat heater and capacitive sensor capable of operating, at a time, either in heating mode or in occupant-sensing mode. The device includes a sensor/heat pad for transmitting a sensing signal, a first diode coupled to a first node of the sensor/heat pad, a second diode coupled to a second node of the sensor/heat pad, a first transistor coupled to the first diode and a second transistor coupled to the second diode. During sensing mode, the first and second transistors are opened and the nodes between the first transistor and the first diode, as well as between the second transistor and the second diode are reverse-biased to isolate the sensor/heat pad from the power supply of the heating circuit.

US 2009/0295199 discloses a combined seat heater and capacitive sensor, wherein each of the two terminals of the heating element is connected to the heating power supply via two transistors in series. The device may not operate in sensing mode and in heating mode at a time. When the device is in sensing mode, the nodes between each pair of transistors are actively kept at the same potential as the heating element by means of respective voltage followers in order to neutralize any open-switch impedance of the transistors.

The very same idea has already been disclosed in U.S. Pat. No. 6,703,845. As an alternative to transistors, that document discloses inductors to achieve a high impedance at the frequency of the oscillating signal between the heating element and the power source of the heating circuit. As in the previously discussed document, a voltage follower maintains the intermediate nodes substantially at the same potential as the heating element in order to effectively isolate, at the frequency of the oscillating signal, the power supply of the heating circuit from the heating element.

Yet another combined seat heater and capacitive sensor is disclosed in US 2011/121618 A1. According to this document, the two terminals of the heating element are connected to the heating power supply via a common mode choke for AC isolating the heating circuit from the heating element during the sensing mode. According to US 2011/121618 A1, the isolation circuit comprising a common mode choke between the heater circuit and the heater element increases the accurateness of the capacitive detection as the impedance of the of the heater circuit is effectively isolated from the capacitive detection circuit.

The common mode choke will have some leakage flux between windings A and B hence incomplete cancellation. It follows that when using a seat heater as a capacitive occupant sensor, in so-called loading measurement mode, together with a common mode choke in the heater supply wires, the inductance introduces an error on the capacitive measurement. Variations of the measurement drive voltage introduce an additional error on the measurement.

BRIEF SUMMARY

The invention provides a combined seat heater and capacitive occupancy sensor, in which the inaccuracies due to the above mentioned errors are reduced.

In order to overcome the above-mentioned problem, the present invention proposes to perform two measurements with two different frequencies. In a first step, the carrier frequency is set to a first known carrier frequency, the complex current through inductance and unknown capacitance and complex drive voltage are measured. In a second step, the carrier frequency is set to a second known carrier frequency, the complex current through inductance and unknown capacitance and complex drive voltage are measured. The measured complex values are used in a formula which yields the unknown capacitance.

In a second embodiment of the invention, four different measurements are taken. A first measurement indicative of the unknown capacitance is taken at a first known carrier frequency, the second indicative of a reference impedance at the same first known carrier frequency, the third indicative of the unknown capacitance at a second known carrier frequency, the fourth indicative of a reference impedance at the same second known carrier frequency. The measured complex currents in the four cases are used in a formula which yields the unknown capacitance.

BRIEF DESCRIPTION OF THE DRAWINGS

Preferred embodiments of the invention will now be described, by way of example, with reference to the accompanying drawings in which.

DETAILED DESCRIPTION

Figure 1:
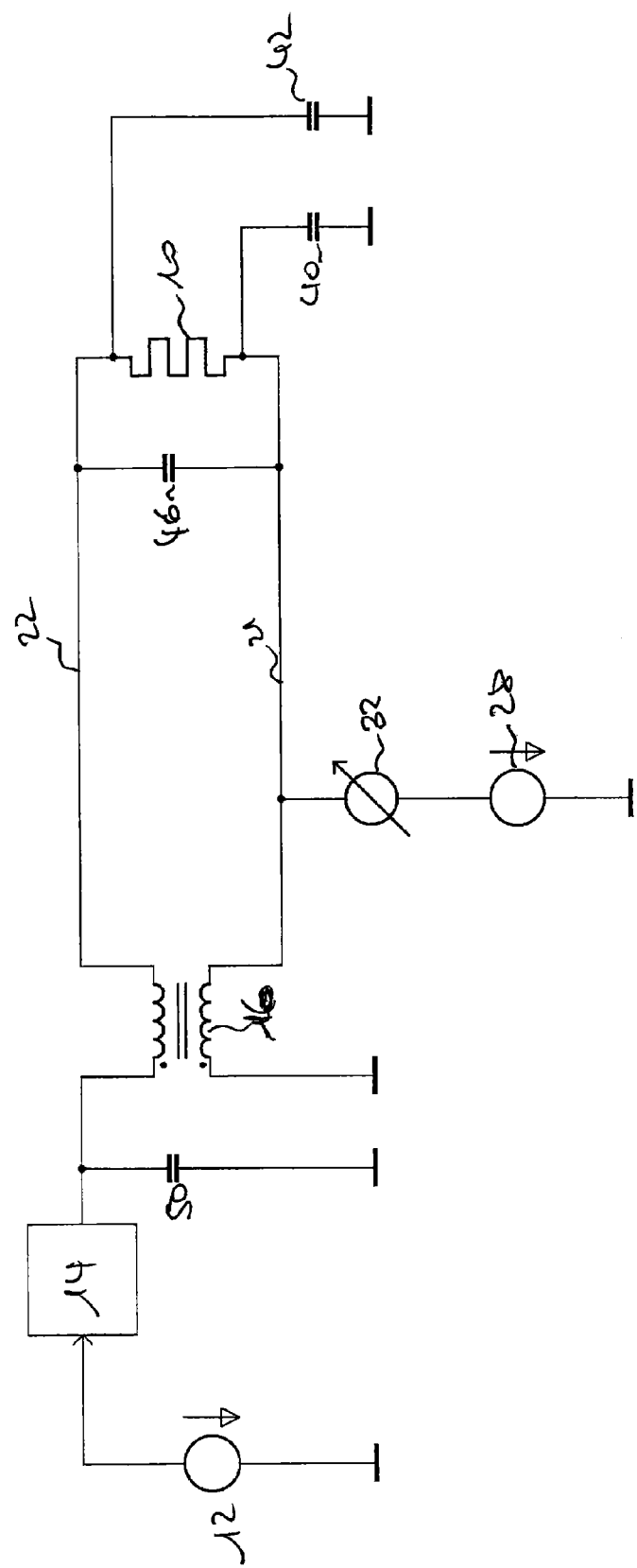
FIG. 1 is a schematic circuit diagram of a combined seat heater and capacitive occupancy sensor according to a first embodiment of the invention.

FIG. 1 shows a block schematic diagram of a combined seat heater and capacitive occupancy sensor according to a first embodiment of the invention. The seat heater comprises a heating element 10, which is used by the capacitive occupancy sensor as an antenna electrode, which capacitively couples to ground. The strength of the capacitive coupling between the heating element 10 and ground depends on whether an occupant is present in the zone between the heating element 10 and the grounded counter-electrode. In a loading-mode capacitive occupancy sensor for a vehicle seat, the grounded counter-electrode normally corresponds to the vehicle chassis.

Turning first to the seat heater, the heater network includes power source 12 supplying the required DC heating current to the heating element 10 to perform the heating function. The heater network comprises a switch 14, which turns the DC heating current on and off, depending on the actual and required temperature of the seat heater. The switch 14 may e.g. be controlled by a user-actuatable master switch (which activates or deactivates the seat heater as a whole) and control electronics (including e.g. a thermostat) that regulate the temperature to ascertain comfortable seating.

The heating element 10 is connected between a first 21 and a second 22 node. When a potential difference is applied by the power supply between the first and the second nodes 21, 22, the heating current flows across the heating element 10, which is thus caused to dissipate heat. The heating element 10 is operatively connected to the power source 12 with a first mode choke 16. Common mode choke 16 exhibits low impedance to DC but substantial impedance to AC at the operating frequency of the capacitive occupancy sensor.

When the seat heater is supplied with DC heating current (i.e. when switch 14 is closed), current flows from power source 12 though switch 14, the first winding of common mode choke 16, the node 22 herein designated as second node, the heating element 10, the node 21 herein designated as first node, the second winding of common mode choke 16, and to ground potential.

Switch 14 may be used to control the temperature of the seat by switching the seat heater on and off. A temperature sensor (not shown in the drawings) integrated in the seat may determine the seat temperature. A heating controller (e.g. a microcontroller) connected to switch 14 and to the temperature sensor reads the actual seat temperature from the temperature sensor and switches switch 14 on or off depending on the required temperature and the actually measured temperature. Such temperature control may be applied likewise to all the embodiments described herein.

Capacitors 40 and 42 symbolically represent the capacitive coupling of the heating element 10 to a grounded electrode (typically the vehicle frame). The capacitance (and hence the impedance) of these capacitors 40, 42 depends on whether the space between the heating element 10 and the grounded electrode is occupied by a conductive body (e.g. an occupant) or not.

The capacitive sensing network comprises an AC voltage source 28, which is connected to the first node 21 via current meter 32. AC voltage source 28 generates a carrier frequency with selectable value. The frequency is set by a microcontroller not shown in this figure to one of two distinct known frequencies. The amplitude of the AC voltage of source 28 is not known. Current meter 32 measures the current flowing into the parallel combination of the impedance respectively admittance to be measured and the common mode choke.

The current measured by current meter 32 is demodulated with an IQ demodulator not shown in the figure, which uses the AC source 28 as local oscillator input. The IQ demodulator outputs the real and imaginary parts of the current measured with current meter 32. The real part is indicative of the resistive part (conductance) of the admittance of the parallel combination of the unknown admittance and the common mode choke. The imaginary part is indicative of the reactive part (susceptance) of the admittance of parallel combination of the unknown admittance and the common mode choke.

In addition, the voltage on node 21, at the output of AC voltage source, and thereby the voltage across the unknown capacitance, is also measured, preferably also with an IQ demodulator which yields a complex value for the measured AC voltage. It is important to note that the phase reference (local oscillator input of the IQ demodulator) is the same for both measurements of complex current and voltage.

The measurements are taken at two distinctive carrier frequencies. The sequencing of the measurements is done by the microcontroller mentioned above, the outputs of the IQ demodulators are preferably measured by an analog-to-digital converter incorporated in the microcontroller. The computation of the final capacitance is done in software inside the microcontroller. In a first step, the carrier frequency is set to a first known carrier frequency f1, the complex current through current meter 32 and complex voltage at node 51 are measured. In a second step, the carrier frequency is set to a second known carrier frequency f2, the complex current through current meter 32 and complex voltage at node 51 are measured again.

The following formula then yields the unknown capacitance:

$$C_x = \mathrm{re}\left(\frac{\frac{f_1 \cdot I_{x1}}{U_1} - \frac{f_2 \cdot I_{x2}}{U_2}}{2 \cdot \pi \cdot i \cdot (f_1^2 - f_2^2)}\right)$$

wherein
$C_x$ is the unknown capacitance in Farad
re(z) is a function which returns a real part of a complex number z
$f_1$ is said first carrier frequency in Hertz
$f_2$ is said second carrier frequency in Hertz
$I_{x1}$ is the measured complex current in Ampere at the first known carrier frequency indicative of the unknown impedance
$I_{x2}$ is the measured complex current in Ampere at the second known carrier frequency indicative of the unknown impedance
$U_1$ is the measured complex voltage on node 21 in Volt at the first known carrier frequency
$U_2$ is the measured complex voltage on node 21 in Volt at the second known carrier frequency.

The capacitive sensing network shown in FIG. 1 further comprises a coupling capacitor 46, which represents an AC shunt of the heating element 10. The impedance of capacitor 46 is chosen substantially smaller than the impedance of the total capacitance to be measured. In the absence of capacitor 46, an interruption (break) of the heating element 10 would result in a substantially smaller antenna electrode: this, in turn, would reduce the measurable capacitance. For instance, if heating element 10 shown in FIG. 1 breaks in the middle, only capacitance 40 would be measured by the measurement circuit. Coupling capacitor 46 achieves an AC short between the first and second nodes 21, 22, i.e. the terminals of the heating element 10. If a (single) break occurs in heating element 10, then the capacitive sensing network remains substantially unaffected and still measures the total capacitance between the heating element 10 and ground due to the AC shunt provided by capacitor 46. Coupling capacitor 50 provides an AC short between the fifth node 25 and the sixth node 26. Capacitor 50 avoids that any AC current coming from the AC signal source 28 is fed back into the DC power source 12 and thereby possibly into the car power network.

Figure 2:
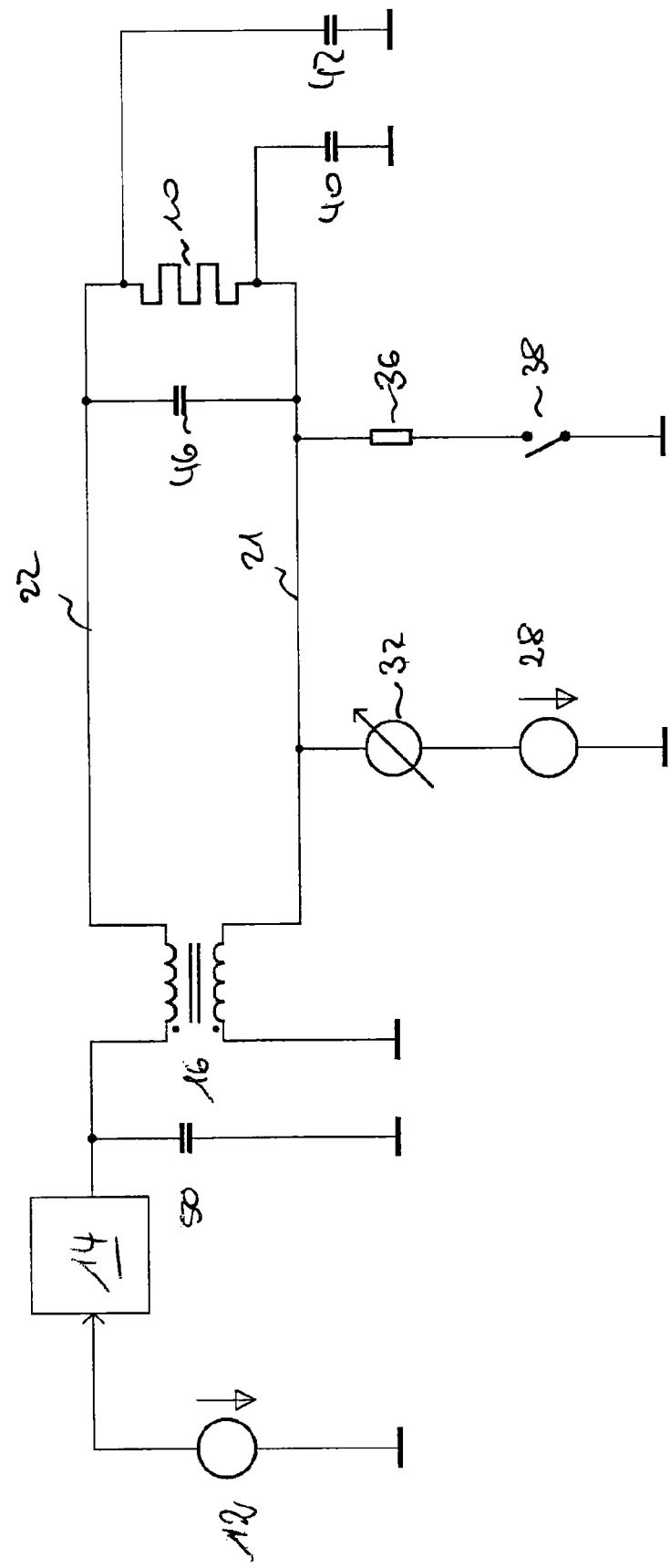
FIG. 2 is a schematic circuit diagram of a combined seat heater and capacitive occupancy sensor according to a second embodiment of the invention.

FIG. 2 shows a second embodiment of the invention, which slightly differs from the embodiment illustrated in FIG. 1. Elements in common to both embodiments, having the same or substantially the same function, have been given the same reference numbers in FIG. 2 as in FIG. 1 and need not be explained again. In particular, the components of the heater network operate in the same way in both embodiments.

According to the embodiment shown in FIG. 2, the capacitive sensing network comprises a reference impedance 36 and a switch 38 to operatively connect the reference impedance 36 between the heating element and ground. Reference impedance 36 has a known impedance and is connected in series with an electronic switch 38 between the first node 21 and ground.

By switching the second reference impedance 36 in parallel with the capacitance to be determined, the measurement of the AC voltage on node 21 may be replaced by the measurement of a reference impedance.

AC voltage source 28 generates a carrier frequency with selectable value. The frequency is set by a microcontroller not shown in this figure to one of two distinct known frequencies. The amplitude of the AC voltage of source 28 is not known due to for example finite output impedance of the voltage source or due to component tolerances. Reference impedance 36 is optionally connected in parallel to the capacitance to be measured by electronic switch 38. Electronic switch 38 is controlled by the microcontroller. Current meter 32 measures the current flowing into the parallel combination of the impedance respectively admittance to be measured and the common mode choke and the optionally paralleled reference impedance 36.

The current measured by current meter 32 is demodulated with an IQ demodulator not shown in the figure, which uses the AC source 28 as local oscillator input. The IQ demodulator outputs the real and imaginary parts of the current measured with current meter 32. The real part is indicative of the resistive part (conductance) of the admittance of the parallel combination of the unknown admittance and the common mode choke. The imaginary part is indicative of the reactive part (susceptance) of the admittance of parallel combination of the unknown admittance and the common mode choke.

Four different measurements are taken. The sequencing of the measurements is done by the microcontroller mentioned above, the output(s) of the IQ demodulator is preferably measured by an analog-to-digital converter incorporated in the microcontroller. The computation of the final capacitance is done in software inside the microcontroller. The first measurement is taken at a first known carrier frequency f1 without paralleled reference impedance 36, the second at the same first known carrier frequency f1 with reference impedance 36 connected in parallel to the unknown capacitances 40 and 42, the third at a second known carrier frequency f2 without paralleled reference impedance 36, the fourth at the same second known carrier frequency f2 with reference impedance 36 connected in parallel to the unknown capacitances 40 and 42. The measured complex currents (measured at the output of the IQ demodulator) in the four cases are used in the following formula which yields the unknown capacitance:

$$C_x = \mathrm{re}\left(\frac{\frac{f_1 \cdot I_{x1} \cdot Y_{ref1}}{I_{x\_ref1} - I_{x1}} - \frac{f_2 \cdot I_{x2} \cdot Y_{ref2}}{I_{x\_ref2} - I_{x2}}}{2 \cdot \pi \cdot i \cdot (f_1^2 - f_2^2)}\right)$$

wherein
$C_x$ is the unknown capacitance in Farad
re(z) is a function which returns a real part of a complex number z
$f_1$ is said first carrier frequency in Hertz
$f_2$ is said second carrier frequency in Hertz
$I_{x1}$ is the measured complex current in Ampere at the first known carrier frequency indicative of the unknown impedance $I_{x2}$ is the measured complex current in Ampere at the second known carrier frequency indicative of the unknown impedance $I_{x\_ref1}$ is the measured complex current in Ampere at the first known carrier frequency indicative of the paralleled unknown and reference impedances $I_{x\_ref2}$ is the measured complex current in Ampere at the second known carrier frequency indicative of the paralleled unknown and reference impedances $Y_{ref1}$ is the complex admittance of the known reference impedance in Mhos at the first known carrier frequency $Y_{ref2}$ is the complex admittance of the known reference impedance in Mhos at the second known carrier frequency.

In a further embodiment, the reference impedance is measured independently of the unknown capacitance. For example, when the first known carrier frequency is set, the electronic switch 38 is switched on and off with a fixed modulation frequency substantially lower than the carrier frequency, for example 1 kHz. It is assumed that the unknown capacitance changes with a frequency which is substantially lower than the modulation frequency. The outputs of the IQ demodulator will also be modulated with the 1 kHz modulation frequency. The amplitude of the IQ demodulator outputs will be indicative of the reference impedance, while the mean value of the IQ demodulator outputs will be indicative of the unknown capacitance. Thereby, a separation of the unknown capacitance and reference impedance is achieved. The measurement is repeated at a second known carrier frequency, and the following formula is applied to calculate the unknown capacitance:

$$C_x = \mathrm{re}\left(\frac{\frac{f_1 \cdot I_{x1} \cdot Y_{ref1}}{I_{ref1}} - \frac{f_2 \cdot I_{x2} \cdot Y_{ref2}}{I_{ref2}}}{2 \cdot \pi \cdot i \cdot (f_1^2 - f_2^2)}\right)$$

wherein $C_x$ is the unknown capacitance in Farad re(z) is a function which returns a real part of a complex number z $f_1$ is said first carrier frequency in Hertz $f_2$ is said second carrier frequency in Hertz $I_{x1}$ is the measured complex current in Ampere at the first known carrier frequency indicative of the unknown impedance $I_{x2}$ is the measured complex current in Ampere at the second known carrier frequency indicative of the unknown impedance $I_{ref1}$ is the measured complex current in Ampere at the first known carrier frequency indicative of the reference impedance $I_{ref2}$ is the measured complex current in Ampere at the second known carrier frequency indicative of the reference impedance $Y_{ref1}$ is the complex admittance of the known reference impedance in Mhos at the first known carrier frequency $Y_{ref2}$ is the complex admittance of the known reference impedance in Mhos at the second known carrier frequency.

The invention claimed is:

1. A combined heater and capacitive occupancy sensor, comprising:
    a heater network including a heating element connected between a first node and a second node and configured to dissipate heat when a heating current is caused to flow between said first and second nodes, said first and second nodes being connected via a common mode choke to a heater power supply;
    a capacitive sensing network connected to said heating element, said capacitive sensing network configured to apply an oscillating signal to said heating element and to derive a capacitive load of said heating element from a current flowing into or a voltage resulting on said heating element in response to an application of said oscillating signal; said capacitive sensing network comprising an AC signal source and a current meter connected in series to one of said first and second nodes and a control and detection circuit configured for measuring a voltage applied to and a current flowing into said heating element in response to said voltage,
    wherein said AC signal source is configured for generating AC signals with at least a first carrier frequency and at least a second carrier frequency, said second carrier frequency being different from said first carrier frequency, and wherein said control and detection circuit is configured for measuring said voltage and said current at least for said two different carrier frequencies generated by said AC signal source.

2. The combined heater and capacitive occupancy sensor according to claim 1, wherein said control and detection circuit is configured for determining an unknown capacity $C_x$ of said heating element towards ground as $$C_x = \mathrm{re}\left(\frac{\frac{f_1 \cdot I_{x1}}{U_1} - \frac{f_2 \cdot I_{x2}}{U_2}}{2 \cdot \pi \cdot i \cdot (f_1^2 - f_2^2)}\right)$$

wherein $C_x$ is the unknown capacitance in Farad re(z) is a function which returns a real part of a complex number z $f_1$ is said first carrier frequency in Hertz $f_2$ is said second carrier frequency in Hertz $I_{x1}$ is the measured complex current in Ampere at the first known carrier frequency indicative of the unknown impedance;

$I_{x2}$ is the measured complex current in Ampere at the second known carrier frequency indicative of the unknown impedance;

$U_1$ is the measured complex voltage in Volt applied to the heater element at the first known carrier frequency $U_2$ is the measured complex voltage in Volt applied to the heater element at the second known carrier frequency.

3. The combined heater and capacitive occupancy sensor according to claim 1, wherein said capacitive sensing network comprises a reference impedance and a switch to operatively connect the second reference impedance between the heating element and ground.

4. The combined heater and capacitive occupancy sensor according to claim 3, wherein said control and detection circuit is configured for determining said unknown capacitance by means of the formula:

$$C_x = \mathrm{re}\left(\frac{\frac{f_1 \cdot I_{x1} \cdot Y_{ref1}}{I_{x\_ref1} - I_{x1}} - \frac{f_2 \cdot I_{x2} \cdot Y_{ref2}}{I_{x\_ref2} - I_{x2}}}{2 \cdot \pi \cdot i \cdot (f_1^2 - f_2^2)}\right)$$

wherein $C_x$ is the unknown capacitance in Farad re(z) is a function which returns a real part of a complex number z $f_1$ is said first carrier frequency in Hertz $f_2$ is said second carrier frequency in Hertz $I_{x1}$ is the measured complex current in Ampere at the first known carrier frequency indicative of the unknown impedance $I_{x2}$ is the measured complex current in Ampere at the second known carrier frequency indicative of the unknown impedance $I_{x\_ref1}$ is the measured complex current in Ampere at the first known carrier frequency indicative of the paralleled unknown and reference impedances $I_{x\_ref2}$ is the measured complex current in Ampere at the second known carrier frequency indicative of the paralleled unknown and reference impedances $Y_{ref1}$ is the complex admittance of the known reference impedance in Mhos at the first known carrier frequency $Y_{ref2}$ is the complex admittance of the known reference impedance in Mhos at the second known carrier frequency.

5. The combined heater and capacitive occupancy sensor according to claim 3, wherein said control and detection circuit is configured for determining said unknown capacitance by means of the formula:

$$C_x = \text{re}\left(\frac{\frac{f_1 \cdot I_{x1} \cdot Y_{ref1}}{I_{ref1}} - \frac{f_2 \cdot I_{x2} \cdot Y_{ref2}}{I_{ref2}}}{2 \cdot \pi \cdot i \cdot (f_1^2 - f_2^2)}\right)$$

wherein $C_x$ is the unknown capacitance in Farad re(z) is a function which returns a real part of a complex number z $f_1$ is said first carrier frequency in Hertz $f_2$ is said second carrier frequency in Hertz $I_{x1}$ is the measured complex current in Ampere at the first known carrier frequency indicative of the unknown impedance $I_{x2}$ is the measured complex current in Ampere at the second known carrier frequency indicative of the unknown impedance $I_{ref1}$ is the measured complex current in Ampere at the first known carrier frequency indicative of the reference impedance $I_{ref2}$ is the measured complex current in Ampere at the second known carrier frequency indicative of the reference impedance $Y_{ref1}$ is the complex admittance of the known reference impedance in Mhos at the first known carrier frequency $Y_{ref2}$ is the complex admittance of the known reference impedance in Mhos at the second known carrier frequency.

6. The combined heater and capacitive occupancy sensor according to claim 4, wherein said control and detection circuit is configured for determining said unknown capacitance by means of the formula:

$$C_x = \text{re}\left(\frac{\frac{f_1 \cdot I_{x1} \cdot Y_{ref1}}{I_{ref1}} - \frac{f_2 \cdot I_{x2} \cdot Y_{ref2}}{I_{ref2}}}{2 \cdot \pi \cdot i \cdot (f_1^2 - f_2^2)}\right)$$

wherein $C_x$ is the unknown capacitance in Farad re(z) is a function which returns a real part of a complex number z $f_1$ is said first carrier frequency in Hertz $f_2$ is said second carrier frequency in Hertz $I_{x1}$ is the measured complex current in Ampere at the first known carrier frequency indicative of the unknown impedance $I_{x2}$ is the measured complex current in Ampere at the second known carrier frequency indicative of the unknown impedance $I_{ref1}$ is the measured complex current in Ampere at the first known carrier frequency indicative of the reference impedance $I_{ref2}$ is the measured complex current in Ampere at the second known carrier frequency indicative of the reference impedance $Y_{ref1}$ is the complex admittance of the known reference impedance in Mhos at the first known carrier frequency $Y_{ref2}$ is the complex admittance of the known reference impedance in Mhos at the second known carrier frequency.

7. The combined heater and capacitive occupancy sensor according to claim 2, wherein said capacitive sensing network comprises a reference impedance and a switch to operatively connect the second reference impedance between the heating element and ground.

8. The combined heater and capacitive occupancy sensor according to claim 7, wherein said control and detection circuit is configured for determining said unknown capacitance by means of the formula:

$$C_x = \text{re}\left(\frac{\frac{f_1 \cdot I_{x1} \cdot Y_{ref1}}{I_{x\_ref1} - I_{x1}} - \frac{f_2 \cdot I_{x2} \cdot Y_{ref2}}{I_{x\_ref2} - I_{x2}}}{2 \cdot \pi \cdot i \cdot (f_1^2 - f_2^2)}\right)$$

wherein $C_x$ is the unknown capacitance in Farad re(z) is a function which returns a real part of a complex number z $f_1$ is said first carrier frequency in Hertz $f_2$ is said second carrier frequency in Hertz $I_{x1}$ is the measured complex current in Ampere at the first known carrier frequency indicative of the unknown impedance $I_{x2}$ is the measured complex current in Ampere at the second known carrier frequency indicative of the unknown impedance $I_{x\_ref1}$ is the measured complex current in Ampere at the first known carrier frequency indicative of the paralleled unknown and reference impedances $I_{x\_ref2}$ is the measured complex current in Ampere at the second known carrier frequency indicative of the paralleled unknown and reference impedances $Y_{ref1}$ is the complex admittance of the known reference impedance in Mhos at the first known carrier frequency $Y_{ref2}$ is the complex admittance of the known reference impedance in Mhos at the second known carrier frequency.

9. The combined heater and capacitive occupancy sensor according to claim 7, wherein said control and detection circuit is configured for determining said unknown capacitance by means of the formula:

$$C_x = \text{re}\left(\frac{\frac{f_1 \cdot I_{x1} \cdot Y_{ref1}}{I_{ref1}} - \frac{f_2 \cdot I_{x2} \cdot Y_{ref2}}{I_{ref2}}}{2 \cdot \pi \cdot i \cdot (f_1^2 - f_2^2)}\right)$$

wherein
$C_x$ is the unknown capacitance in Farad
re(z) is a function which returns a real part of a complex number z
$f_1$ is said first carrier frequency in Hertz
$f_2$ is said second carrier frequency in Hertz
$I_{x1}$ is the measured complex current in Ampere at the first known carrier frequency indicative of the unknown impedance
$I_{x2}$ is the measured complex current in Ampere at the second known carrier frequency indicative of the unknown impedance
$I_{ref1}$ is the measured complex current in Ampere at the first known carrier frequency indicative of the reference impedance
$I_{ref2}$ is the measured complex current in Ampere at the second known carrier frequency indicative of the reference impedance
$Y_{ref1}$ is the complex admittance of the known reference impedance in Mhos at the first known carrier frequency
$Y_{ref2}$ is the complex admittance of the known reference impedance in Mhos at the second known carrier frequency.

10. The combined heater and capacitive occupancy sensor according to claim 8, wherein said control and detection circuit is configured for determining said unknown capacitance by means of the formula:

$$C_x = \text{re}\left(\frac{\frac{f_1 \cdot I_{x1} \cdot Y_{ref1}}{I_{ref1}} - \frac{f_2 \cdot I_{x2} \cdot Y_{ref2}}{I_{ref2}}}{2 \cdot \pi \cdot i \cdot (f_1^2 - f_2^2)}\right)$$

wherein
$C_x$ is the unknown capacitance in Farad
re(z) is a function which returns a real part of a complex number z
$f_1$ is said first carrier frequency in Hertz
$f_2$ is said second carrier frequency in Hertz
$I_{x1}$ is the measured complex current in Ampere at the first known carrier frequency indicative of the unknown impedance
$I_{x2}$ is the measured complex current in Ampere at the second known carrier frequency indicative of the unknown impedance
$I_{ref1}$ is the measured complex current in Ampere at the first known carrier frequency indicative of the reference impedance
$I_{ref2}$ is the measured complex current in Ampere at the second known carrier frequency indicative of the reference impedance
$Y_{ref1}$ is the complex admittance of the known reference impedance in Mhos at the first known carrier frequency
$Y_{ref2}$ is the complex admittance of the known reference impedance in Mhos at the second known carrier frequency.

* * * * *